Figure 1:
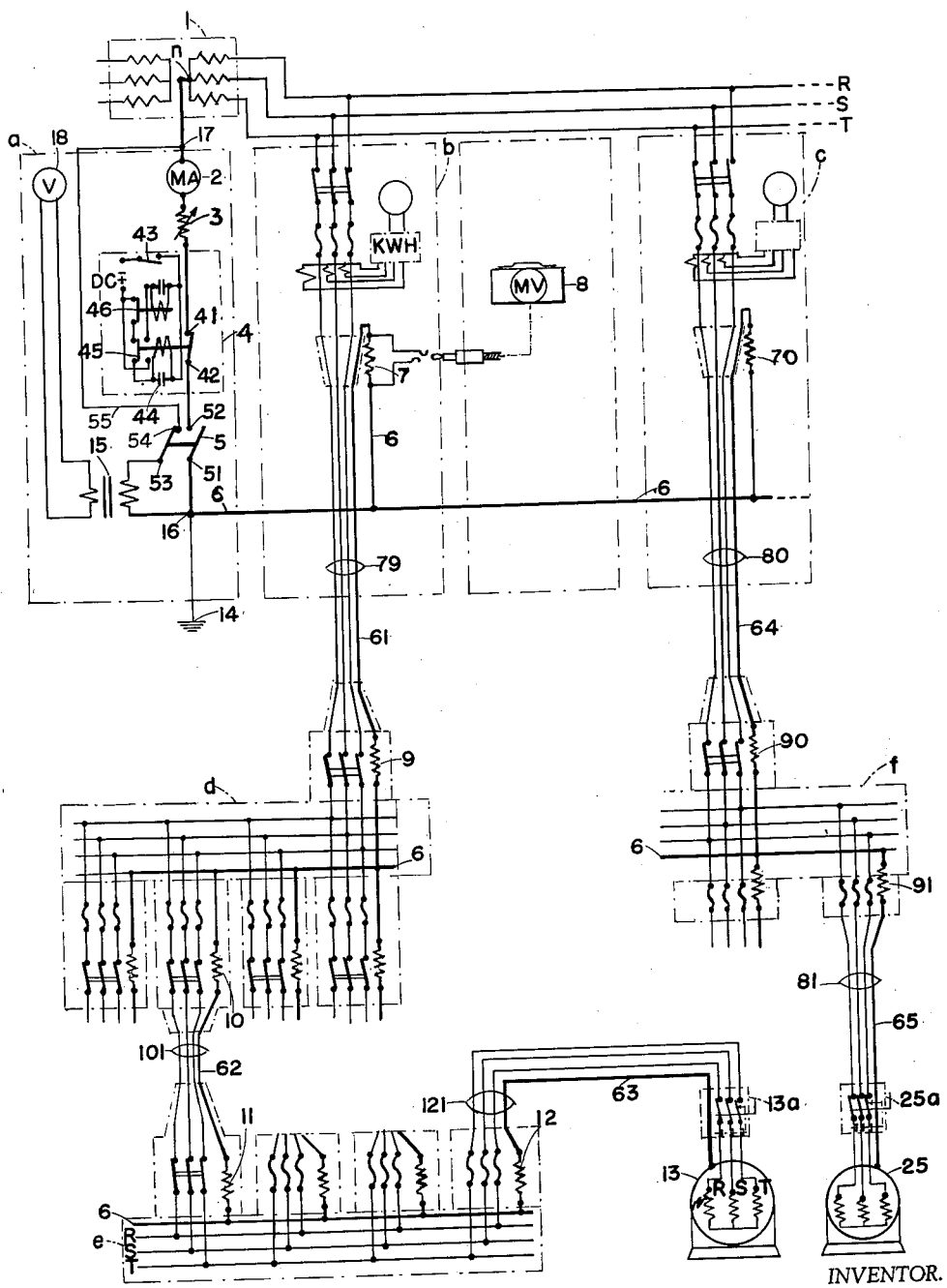

United States Patent Office 3,031,613
Patented Apr. 24, 1962

3,031,613
SYSTEMS FOR LOCALIZING LEAKAGE IN ELECTRIC NETWORKS
Elof A. B. Höjding, Vapengatan 9, Hagersten, Stockholm, Sweden
Filed Sept. 16, 1955, Ser. No. 534,716
10 Claims. (Cl. 324—52)

It is known by prior art that in an ungrounded energized electric system that is equipped with an isolated neutral point of the power source, the presence of undesired grounds may be indicated by inserting a voltmeter and/or a relay between the neutral point of the power source and the ground. If in any point of the system a contact to ground should occur a current through the neutral point voltmeter or relay will be produced, and the meter would show a deflection or the relay would release.

In order to obtain a selectivity in the indication of a leakage to ground so that the place of leakage, the ground-faulty object in the plant, may be nearer located, several methods and devices known by prior art have been proposed. One of them is, when leakage to ground has occurred and is visible on the voltmeter, manually to disconnect the different apparatus of the plant, whereupon the leakage indication will cease, as soon as the defective part has been found and is disconnected. Another known and somewhat advanced method, proposed for instance in alternating three-phase systems, consists in connecting in parallel to the neutral point potential transformer a regulating resistor, when the fault is to be located. The outgoing wires connected to the bus bars of the power transformer, are provided with either an ordinary current transformer around each phasewire in the switchboard of the transformer sub-station and the three secondaries connected in zero-connection, or with a single current transformer surrounding all the three phases in a group, for indicating the ground-fault-current by means of an ammeter. The current due to the fault may then be increased manually by means of the said resistor to such a value that the faulty group evidently may appear in one of the said ammeters in the switchboard.

The method referred to above, however, cannot be used in usual plants, where the network is feeding a plurality of both small and big electric objects, as for instance small starting contactors and big motors with big cables, because experience has proved that, for many reasons, it is necessary to increase the leakage-to-ground current to a relatively high value, e.g. 15A, before it will clearly appear in a group-ammeter of the switchboard of the main station.

Unfortunately, the defective object in the unknown place in the plant will then run the risk to be damaged by arc forming, its fuses may be blown, or its overload relays may be released, if the defective object is a small one, for instance, a control circuit to a starting contactor for a bit motor.

Thus, the defective object will be disconnected, and at the same instant the ground-fault current will disappear, usually without having been indicated in any group-ammeter on the switchboard of the main station.

The fault location will thus fail due to the ground-fault current being too high. Furthermore, this method imports a considerable risk that important motors or apparatus may be stopped, or fire may break out in the unknown place of the plant, where the contact to ground is or was prevailing.

The excessively high ground-fault current, certainly undesired but necessary, in the method referred to above is due to various reasons, amongst others to the following:

(a) The usual current transformers which normally are carrying hundreds of amperes, are not sensitive enough for a low co-existing leakage current;

(b) The ground-fault current cannot be measured itself, because it appears only as a low unbalanced current in the current transformers energized by the high three-phase currents;

(c) The current transformers indicate misleading deflections in the ground indicating ammeters due to the asymmetry of big working objects and due to transient phenomena in the network, when motors are started or stopped or are changing their working conditions;

(d) The ground-fault current has no reliable return conductor with a constant, low resistance from the ground-faulty object in the plant to the switchboard of the sub-station, hence the ground-fault current returns by unknown paths having different and unstable resistances, e.g., through building parts, grounded objects, or through the ground itself, thus making the fault location impossible.

It is important, particularly in continuously running industries, that a ground fault in said energized electric systems with isolated neutral point of the power source can be located as soon as possible and as long as the leakage to ground is only single-poled. Then the defective object cannot cause any stop or any other electric damage. Most ground faults start single-poled, but if a further ground leakage occurs in one of the other poles (phases in A.C.-systems) of the network either in the same or in another place in the plant, a short circuit will occur between the two fault places, with a damage or break-down as a consequence. Usually the fuses of the smaller of the two objects will blow due to the short circuit.

In electric networks having the neutral point at the power source normally firmly connected to ground under working conditions for satisfying the electric safety regulations, for instance according to Swedish rules, but with every load object connected only between the poles or phases in the network, normally no current will appear in the wire from the ground-electrode to the neutral point of the power source. Hence, it is possible to locate undesired grounds in such grounded neutral systems, as well as in normally ungrounded systems by using the method according to the present invention; provided, however, that the ground-fault current is not so high at once that fuses or overload relays blow immediately or release, so that the tracing ground-fault current does not longer continue.

The object of this invention is to provide means for locating a beginning single-poled ground fault in energized networks by using such a limited fault current from the unknown defective object that it will not be damaged or disconnected, irrespective whether the object is a wire, a conductor, a distributing box, a starting apparatus, a motor, or any other load object.

The invention has for its further object a system for locating without any disturbance in the continuous running of a plant, an initial single-poled leakage to ground in energized electric networks with excess current protection for the different components in the network and with a neutral point which is either isolated from ground, or is grounded and having every load object connected only between the poles or phases of the system, and which is, over a wire for leakage indication, comprising a regulating device for ground-fault current limitation and a current switch, connected to an isolated bus bar, grounded only if needed in order to satisfy for instance the Swedish electric safety regulations.

According to the invention the new combination consists in that the said regulating device is adapted to prevent the ground fault current from releasing the devices for excess current protection in the appertaining parts of the plant, and that insulated outgoing wires are connected to said insulated bus bar, preferably in parallel to the mains, the bus bar and the outgoing wires serving as test circuits for the leakage to ground current, the said outgoing leakage current wires, comprising, besides measuring resistors in the individual wires, further measuring resistors connected in series to the first mentioned resistors and placed in sub and sub-distributing panel boxes the said measuring resistors having low resistance in relation to the resistance or impedance of the regulating device and of the outgoing leakage current wires, the said measuring resistors being appropriated to be connected to an indicator device, suitably consisting of a vacuum-tube or transistor-millivoltmeter, in order to trace the leakage current from the switchgear in the substation to the unknown place of the fault in the plant.

Further characteristics will be given in the following description with reference to the accompanying drawings, which, by way of example, show diagrams of connections of the different parts in the system.

Figure 2:
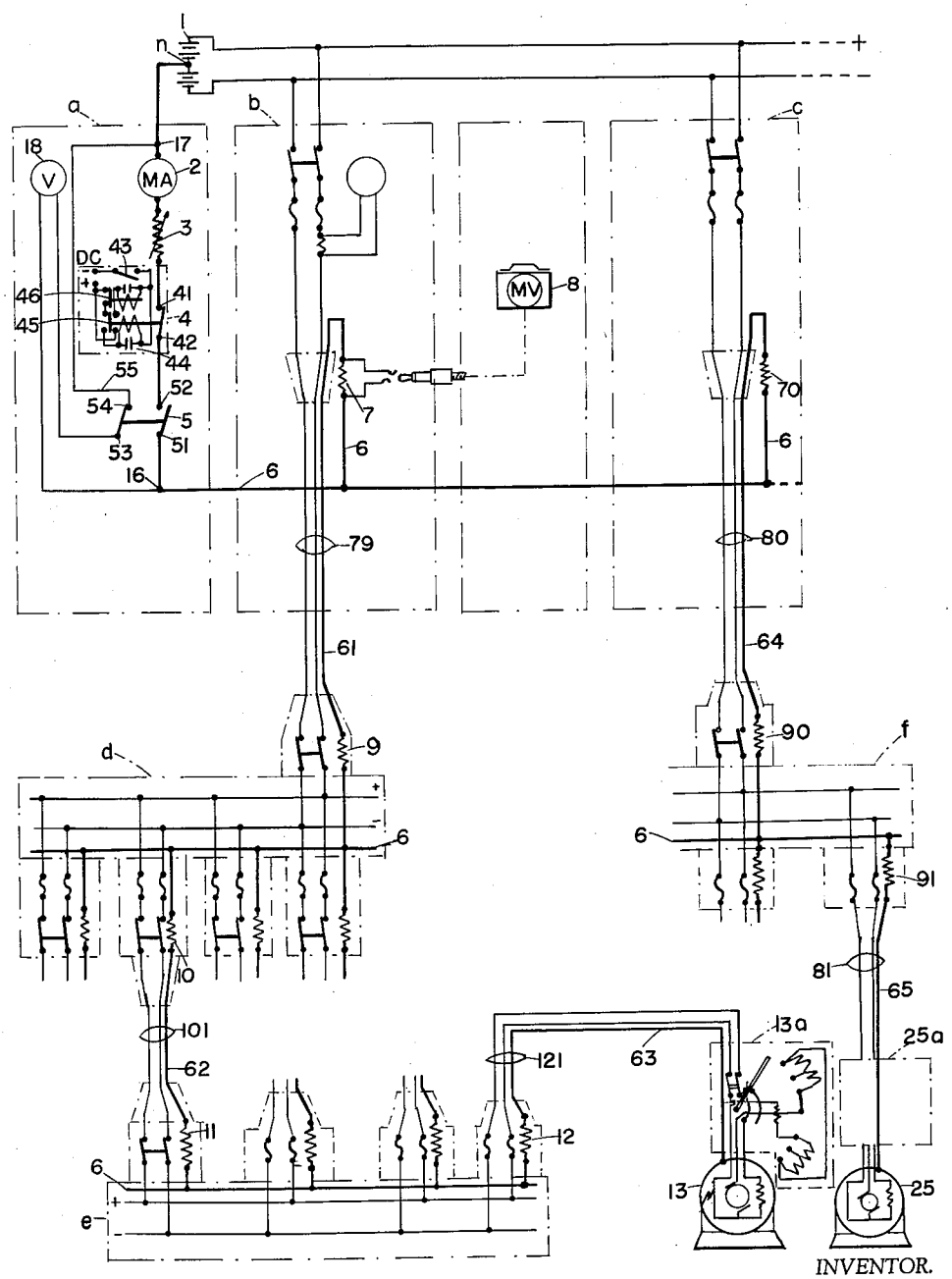

In the drawings:

FIG. 1 shows a diagram of the arrangements according to the invention, applied to an ungrounded three-phase-three-wire alternating current network but using four-wire cables without metallic internal cover, in an industrial plant; and FIG. 2 shows a wiring diagram comprising the same components as FIG. 1, but applied to an ungrounded two-wire direct-current network.

Figure 3:
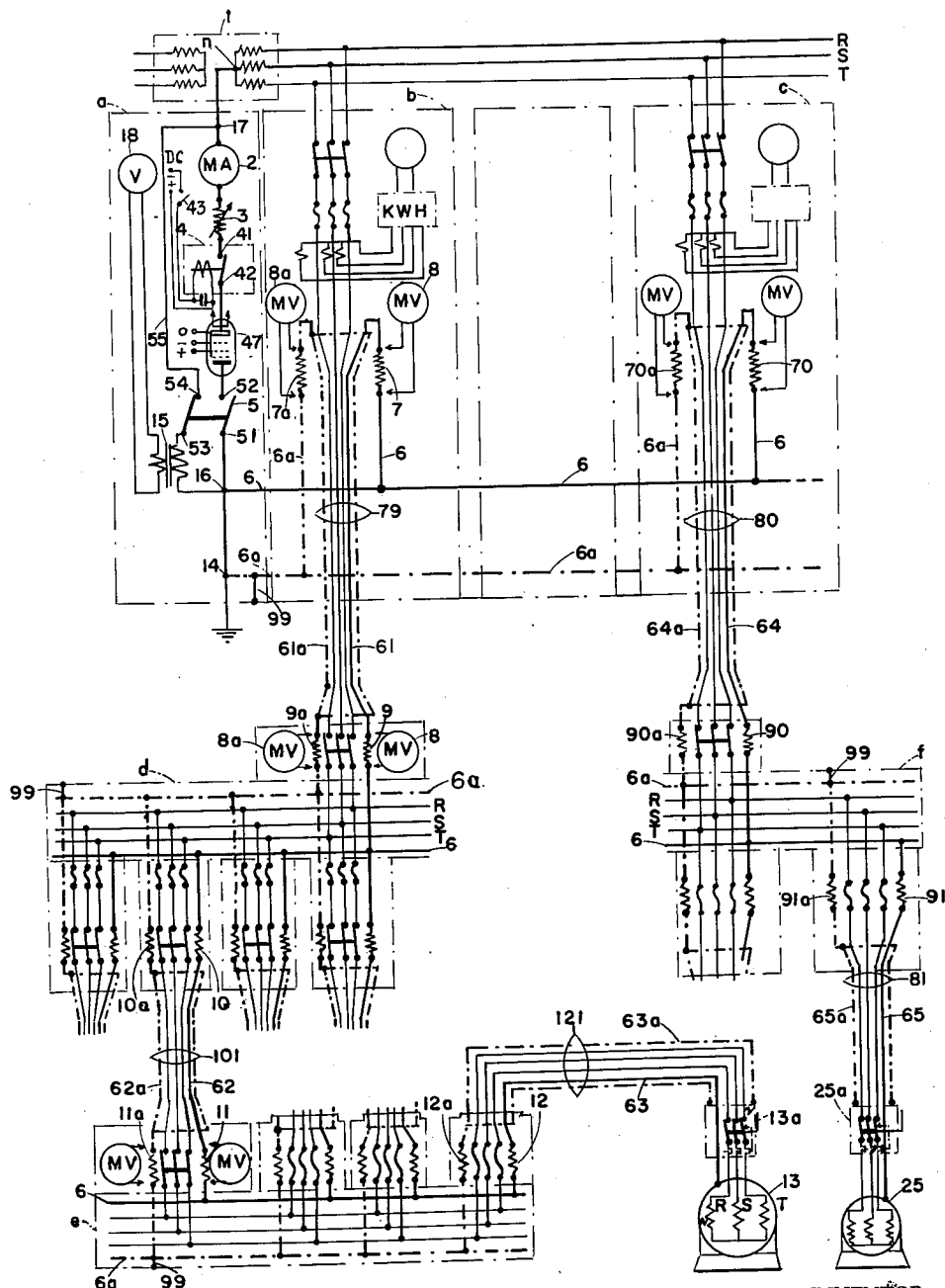

FIG. 3 shows a wiring diagram like in FIG. 1, applied to an ungrounded three-phase-three-wire network, but using four-wire cables with internal metallic covers, said covers terminating in the housings of the starting apparatus and of the distributing panels, the fourth wire of the cables only terminating in the frames of motors or other load objects, furthermore a rectifying device for the ground-fault current.

Figure 4:
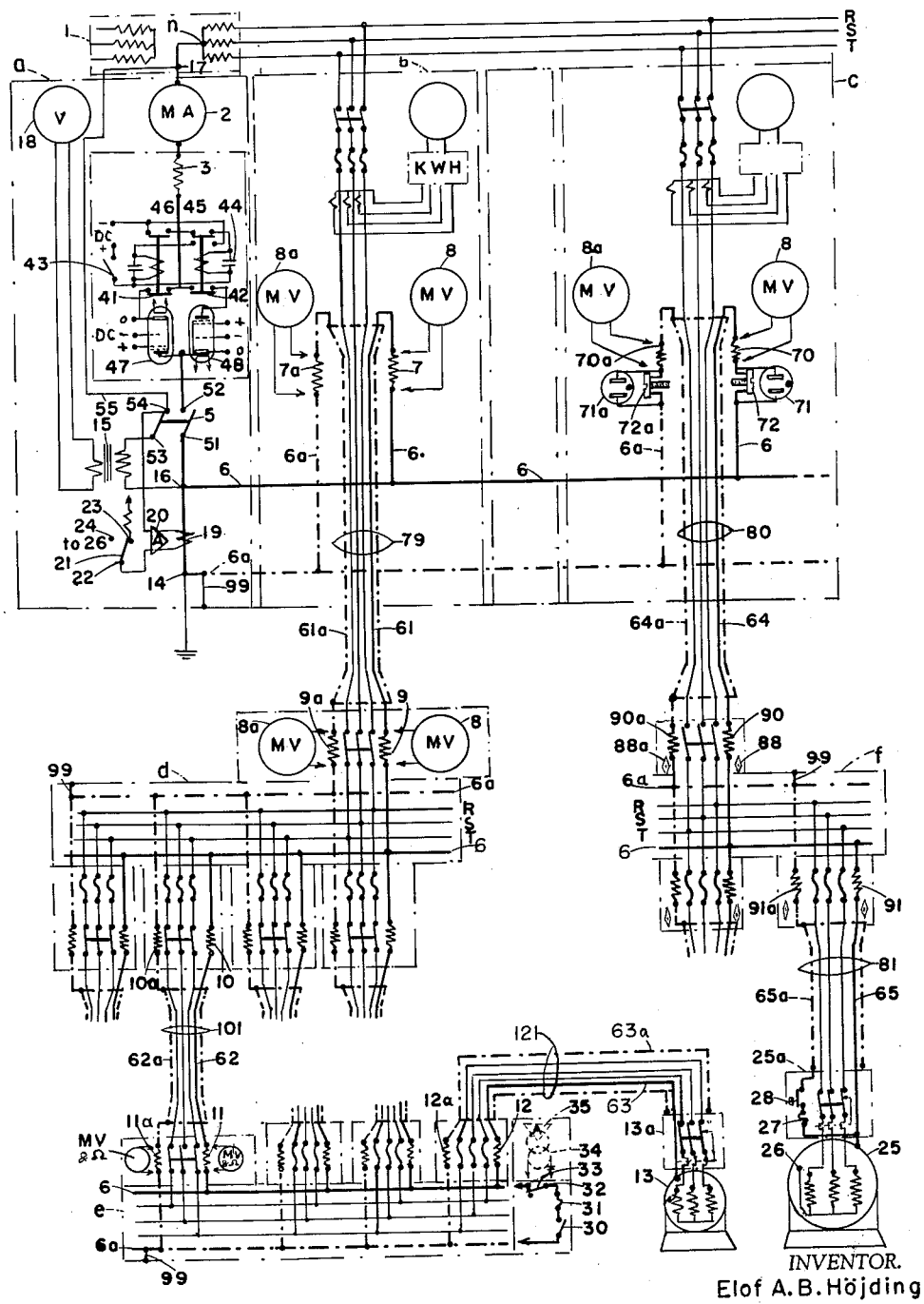

FIG. 4 shows the same wiring diagram and arrangement as in FIG. 3, and, in addition, special compensating devices for neutralizing ground-fault disturbances, rectifying and reversing devices for the ground-fault current and arrangements for safety control.

In the drawings, the reference numeral 1 denotes a power source, shown as a transformer, feeding the bus bars R S T. The neutral point of the secondary winding of the transformer is denoted by n. a is a so-called ground indication panel, b and c denote cells of the switchgear compartment for outgoing main lines, shown as cables 79 and 80. The parts a, b and c are usually placed in the switchgear room of a transformer sub-station.

Furthermore, 2 denotes a milliammeter, 3 a fault current limiting device, for instance a variable resistor, 4 a ground-fault current pulser which automatically and rhythmically closes and opens the ground-fault circuit, 5 a throw-over switch, and 6 an isolated bus bar in the switchgear cells for the isolated outgoing ground leakage current wires 61 and 64, namely the fourth wire in the cables 79 and 80. The bus bar is shown grounded in the drawings only in 14.

The parts 7, 70 in the cells b and c, and the parts 9, 10, 11 and 12 in the distributing boxes d and e are resistors for measuring and tracing the ground fault current and are connected in series to the fourth wires 61, 62, 63 of the cables 79, 101, 121, which, for instance terminates in the motor 13 and is connected to its metallic frame, but not to the starter 13a.

It will be noticed that the leakage current wires 61, 62, 63 do not have to be grounded in any distributing box, as d and e, but only in the bus bar 6 in the switchgear room at the ground electrode 14. The ground electrode 14 may, however, be omitted without disadvantage, if the electric safety regulations do not prescribe grounding.

The parts d and e and f denote conventional cast-iron distributing boxes usually placed in workshops.

The part 8 represents a portable vacuum-tube or transistor-millivoltmeter and is of a special design, by means of which the fault current, flowing to the neutral point n of the power transformer through the measuring resistors 7, 9, 10, 11, and 12 from the ground fault in motor 13, may be traced and distinguished from occasionally co-existing disturbing currents in the measuring circuit 13, 63, 12, 6, 11, 62, 10, 6, 9, 61, 7, 6, 16, 5, 4, 3, 2, n and in their measuring resistors.

In plants of importance it may be suitable that, at least in the switchgear room, a separate, stationary instrument 8 for each of the cells b, c, etc. is provided, the meters suitably being placed together in a separate panel which offers certain advantages. When all instruments thus can be viewed simultaneously, it will be easier to observe which one shows the rythmic deflections which are characteristic for a pulsating ground fault current.

The throw-over switch 5 is shown in its normal position to the right, which open position always is used when no fault locating is to be performed.

The neutral point potential transformer 15 will be passed by a very low leakage current if a ground has appeared anywhere in the plant, and will cause a deflection in the voltmeter 18, constituting a general indication of ground.

The fault current limiting device 3, the automatically working pulser 4, the throw-over switch 5, the isolated leakage current bus bar 6 in the switchgear cells b, c and in distributing boxes d, e, f with their outgoing isolated ground leakage current wires 61, 62, 63, 64, 65, their measuring resistors 7, 9, 10, 11, 12, 70, 90, 91 and the measuring instrument 8 are forming the main parts of the system, by means of which it is possible to trace and to point out in energized networks a ground defective but still working object without disconnecting any electric part of the plant.

Neither the unintentional connection to ground of the motor frame by conducting building parts, as for instance pipelines for water or compressed air, reinforcing steel bars in concrete structures, girders and so on, will impair the use of the system, because, as experience has proved, those outer paths for the leakage current from the defective object to the grounded bus bar 6 in the switchgear room always have a high resistance in comparison with that of the fourth wire 6 in the cables, including their measuring resistors.

If, as shown in FIG. 1, one of the phases (R in the drawing) in the motor 13 makes contact with the frame due to fault, only a very low current produced in the fault in 13 and limited by the neutral point potential transformer 15, will flow from the motor frame through the isolated fourth wire 63 in the motor cable 121 to the measuring resistor 12 and bus bar 6 in the distributing box e through its resistor 11 and the fourth wire 62 in the cable 101 to resistor 10 and the bus bar 6 in the distributing box d; through its resistor 9 and the fourth wire 61 in the cable 79 to resistor 7 in the cell 6 in the switchgear room from 7 to the isolated bus bar 6 in the switchboard in the switchgear room, and from the point 16 on the bus bar through the primary winding of the neutral point potential transformer 15 and contact points 53, 54 in the left part of the throw-over switch 5 and through the wire 55 to the ground-indicating wire n, 17, 2, 3, 4, 5, 16 at point 17 and from that point, to the neutral point n of the power transformer 1.

The fault will thereby be indicated as a general ground-fault in a known manner, causing a deflection in the voltmeter 18, and a drop relay may release.

The tracing and location of the ground fault thus indicated is commenced by switching over the throw-over switch 5 in to the position for locating a ground fault, that is, to the left in the drawing. The contacts 53, 54 in switch 5 then will open disconnecting the potential transformer 15 and the contacts 51, 52 will be closed. The resistor 3 is then to be adjusted to the highest ground fault current allowable in the actual electric installation in order not to risk the disconnection of the unknown defective but still working object. This current value is read on the milliammeter 2, and hereafter the automatically working pulser 4 normally closed in 41, 42 when not in use has to be started by closing its switch 43. The portable measuring instrument 8, a millivoltmeter, thereupon has to be connected successively to the measuring resistors 7, 70 in each of the cells b, c and in the other cells (not shown in the drawing) in the switchgear room, and the rhythmically pulsating ground fault current may then be read when a connection is made to one of the measuring resistors, for instance 7, in the cell b. If accidentally several of the groups, for instance those in c in the switchgear room happen to show deflections on the instrument 8 during the measuring, the group which clearly shows the highest amplitude of pulsation is selected.

From the measuring point 7 in the switchgear room the millivoltmeter is then moved to the enclosed cast-iron distributing box d in another room or in another building, where the next measuring point, resistor 9, will show the same reaction on the meter, as in 71. The outgoing groups in d may now be tested, and the measuring point 10, for instance, will give deflections on the portable meter.

The meter is then moved to the enclosed cast-iron distributing box e in another room or building, and upon continued tracing by measuring of the currents on the resistor 11 and on those of the outgoing groups in e, the resistor 12 gives clear deflections, and it may be found that the leakage to ground must emanate from the still running motor 13 or from its starter 13a or from its feeder 12. If, for instance, the reading in 12 does not show deflections after the starter 13a has been switched off for a few seconds, the ground fault only can be in the running motor 13, and said motor has to be replaced at the next convenient opportunity.

It is essential that the pulser 4 opens and closes the contacts 41, 42 in the fault current circuit rhythmically and that these repeated impulses will be of another duration than the irregularly occurring impulses from, for instance, asymmetry, varying working conditions of big motors, transients, etc., which sometimes also will be indicated by the said measuring instrument. Experience has provided that regular movements of the pointer of the meter 8 are very easily recognized, even if the pointer at the same time performs big but irregular deflections. A rhythm of switching-on during half a second, followed by a disconnection during the same increment of time has proved to be useful. For that reason it is essential that the damping of the measuring instrument 8 does not render it impossible to obtain registration of such a rhythm.

The pulser 4 may certainly be operated manually, but the experience has made it evident that by its manual operation the tracing and locating of ground fault is unsuccessful and will fail, for which reason the pulser 4 ought to work automatically. For instance, two direct-current relays 45, 56 connected in a self-interrupting circuit and provided with time delaying condensers 44 have proved to be useful as a pulser.

The throw-over switch 5 is important, as the neutral point potential transformer 15 must be switched off during the ground fault tracing and locating, since said transformer, due to self-induction, when pulsing with 4, will send disturbing impulses in the circuit of the fault current, which impulses might disturb the deflections due to the ground fault current of the measuring instrument 8, and the fault tracing will fail.

The regulating resistor 3 may, after testing in a certain plant, be replaced by a device for constant current, for instance, a combination of resistors having non-linear resistance characteristics, or of vacuum tubes such as pentodes, described later, which device automatically maintains the ground fault current at a certain constant value for different or varying leakage voltages, for instance, irrespectively of the electrical distance in volts of the ground fault, from the neutral point of the motor 13, or of resistance changes in the same leakage point. This renders the manual after-adjustment of the resistor 3 unnecessary and renders the fault tracing more reliable.

In alternating current plants, as shown in FIG. 1, it is also possible to arrange a rectifying device in the ground fault current circuit, for instance between the pulser 4 and the throw-over switch 5. The rectifier may be for instance a conventional dry-contact rectifier using copper oxide or selenium, or a conventional thermionic single wave rectifier. In the drawing, FIG. 3, there is shown an amplifier vacuum tube 47 of the pentode type, as a single wave rectifier. The rectifying of the fault current with or without pulsing may offer certain advantages in the system. Furthermore, modulating of the rectified ground fault current in alternating current plants, and superposing upon the ground fault current in direct current plants with a signal alternating current can be made by impressing upon the grid of tube 47 a signal alternating voltage.

A constant-current effect on the ground faul current will also be obtained by using the pentode-type tube, shown at 47 in FIG. 3, provided that suitable direct current voltages are applied to its electrodes, and that the fault current is rectified in one direction by this arrangement. In case of such an arrangement, the measuring instrument 8 ought to be provided with one or a plurality of resonance circuits for separating the fault current from other currents.

The use of one or of a plurality of gas-filled discharge tubes with grid electrode may offer certain advantages by rendering it possible at the same time to pulsate, to keep the current constant and, if necessary, to rectify the fault current.

The measuring instrument 8 is a special, calibrated vacuum-tube or transistor-millivoltmeter with a sensitivity of a few millivolts at full deflection on a slightly damped moving-coil instrument. Of course, other optical devices with low inertia may be employed as well, for instance a cathode ray tube, and also accoustic instruments, for instance a telephone receiver, all which depends upon how to pulsate, tune or rectify the fault current. The said moving-coil instrument also may in a known manner, be provided with counter voltage, rendering it possible always to place the rhythmic oscillations of the point about the zero-point of the scale, thus facilitating the reading of the deflection.

When big motors or other circumstances cause disturbing currents with undesired large deflections in the meter of the instrument 8, it is possible to select these voltages which cause the disturbances and, after changing their amplitudes and phases, if necessary, impress them onto the instrument 8 or onto the measuring resistors 7, 9, etc. in an opposite direction, thus preventing or reducing large deflections on the meter.

Each of the measuring resistors 7, 9–12, 70, 90, 91, connected in series to the isolated wires 61, 62, 63, 64, 65 and to the bus bars 6 in cells C, c and in distributing boxes d, e, f, usually must have rather low resistance or impedance (e.g. a few milliohms) so as to satisfy the electrical safety regulations concerning positive release at two-phase to ground contact. In switchboards they may suitably be placed on ceramic sockets, similar to those used in electric neutrals.

For the same reason, that is, for the demand for releasing, the fault current wires 61, 62, 63, 64, 65 have, of course, to be dimensioned to endure the heavy currents occurring in said accidents.

The connection according to the diagram in FIG. 1 also is applicable in the case, when the cables shown only have three wires, but are provided with a metallic internal cover, for instance, of lead, and with an insulating or not conducting external cover, for instance, of jute, paper or plastic. In this case the leakage current wires 61–65 in the drawing may symbolize the metallic cover of the cables, and the sealing ends in the cells $b$ and $c$, etc. in the switchgear room, if they are metallic may not have contact with grounded objects. In the cast-iron distribution boxes $d$ and $e$ and $f$ the sealing ends of the cables, too, may be isolated from the cover of the boxes, but these provisions are not necessary, if a part of said cover of the cables, for instance under the sealing ends, is used as a measuring resistor. The measuring resistors 7, 9, 11, 12, 70, 90, 91 may then be omitted. The isolated bus bar 6 for the leakage current in $d$, $e$ and $f$ may be connected in this case to the metallic housing of the distributing boxes $d$, $e$ and $f$, if needed with respect to the electric safety regulations.

Besides the above mentioned possibility to substitute a part of the metallic internal cover of the cables for the measuring resistor, it also is possible to use the resistance in a part of the fourth wire of four-wire cables as measuring resistor or resistors.

FIG. 2 shows a line diagram in an industrial plant, comprising the same components as in FIG. 1, but applied to an ungrounded two-wire direct current system, and using three-wire cables without internal cover. The power source 1 is shown as a battery, but may be a rectifier or a direct current generator as well. The potential transformer 15 obviously is omitted.

The methods for tracing and locating of a ground fault in such an electric plant are exactly the same as have been described above for ground fault locating in A.C. current plants according to FIG. 1.

FIG. 3 shows a line diagram comprising the same components as in FIG. 1, but with the cable covers 61a–65a constituting a special ground fault current circuit connected to additional bus bars 6a, said additional circuit being of the same kind and having the same function as the circuit of the isolated bus bars 6 and the isolated leakage current wires 61–65 which terminate at the frame of the load objects, for instance the motor 13. This additional ground fault measuring circuit, however, terminates at the cover of the starter 13a and is intended for tracing and locating such grounds which enter into the covers of cables, enclosed switchboards, distributing boxes and starters and which grounds do not emanate from the frames of load objects. The covers of the distributing boxes $d$, $e$ and $f$, therefore, are connected to the bus bars 6a in the connecting points 99.

The method for tracing and locating a ground fault in networks according to FIG. 3 by means of the additional measuring circuit attached to the additional bus bars 6a does not differ from the method described above in connection with the FIG. 1, and will be described in more detail in the following.

In FIG. 3, a ground is assumed occurring in the starter 13a by a phase making contact with the metallic cover of the starter.

The ground fault-current thus produced in 13a will flow from the cover of 13a to the metallic internal cover 63a of the cable 121 and through the measuring resistor 12a to the bus bar 6a in the distributing box $e$. From 6a in $e$, the ground fault current will flow through 11a, 62a in cable 101; 10a, 6a in distributing box $d$; 9a, 61a, 7a, 6a, 14, 16, 15, 53, 54, 55, 17 to $n$. The fault thereby will be indicated by the voltmeter 18 as a general ground fault and/or a drop relay may release.

When tracing and locating the ground fault, the switch 5 will be thrown to the left (in FIG. 3 of the drawing), and assuming the current-limiting device 3 being automatically working the pulser 4 will be started by closing the switch 43. The millivoltmeter 8a in the cell $b$ will then show rhythmic deflections caused by the pulsating ground fault current coming from 13a, which current now will flow to $n$ over the path 16—51—52—42—41—3—2—17—$n$. The millivoltmeter 8 in the cell $b$ will show no deflections and likewise, of course, the millivoltmeter in cell $c$. The tracing of the ground fault current will be continued in the distributing box $d$ at 9a and 10a and in $e$ in the measuring points 11a and 12a.

The ground fault thus must emanate from the cover 63a of the cable 121 or from the starter 13a, and the location of the unknown defective object in the plant is now terminated and provisions have to be made to repair or replace the cable 121 or the starter 13a at the first convenient opportunity.

FIG. 3 shows a rectifying device 47, consisting of a vacuum tube, a pentode. As previously mentioned, it can be used as a single wave rectifier. With suitable direct current voltages applied to its grid and its screen, the tube also will function as a constant-current device, thus replacing 3 if rectifying is desired.

It will be noted that the tube 47 can be used with all the functions mentioned above, even in connection with the diagrams shown in FIGS. 1 and 4; and in the FIG. 2, a direct current plant, it can be used as a constant-current device, and for superimposing an alternating signal current to the ground fault circuit which is a direct current as shown in FIG. 2.

In FIG. 4 the same type of connections and arrangements is shown as in FIG. 3, and in addition special compensating devices for neutralizing offending currents in the fault-current circuits, arrangements for rectifying in two directions and reversing the rectified ground fault current, and some arrangements for safety control.

The disturbance-compensating devices will be described as follows:

In the switchgear room, in the cell $a$, there is placed a compensating transformer 19, giving about half a volt in its secondary winding, that consists of the bus bar between the points 14 and 16. The transformer 19 is fed from a vacuum-tube amplifier and phase controller 20, one pole of which is connected to the neutral point $n$ of the power transformer 1 through 54, 55, 17, to the other pole to the throw-over switch 21. When disturbance-neutralizing is desired, the switch will be thrown to point 24 to the left on the drawing, which point is connected to the neutral point 26 of the winding of the motor 25, from which the disturbances emanate. The transformer 19 will now induce disturbance-neutralizing voltages between the points 14 and 16, which voltages will send a current around in any closed circuit of the wires connected to the two bus bar systems 6 and 6a in the plant. If, for instance, the disturbances from 25 injuriously affect the reading of the deflections caused by the ground fault current to be traced with the instrument 8 or 8a in the switchgear cell $b$, the bus bars 6 and 6a in a suitable distributing box, for instance, $e$ in the drawing, may be connected by closing the switch 30 and closing 32—33, thus causing the compensating disturbance current coming from 19, to flow through the circuit 16—6—7—61—9—6—10—62—11—6—33—32—31—30 and to flow back through 30—6a—11a—62a—10a—6a—9a—61a—7a—6a—14—16. In 8 and 8a in the cell $b$ and in the distributing boxes $d$ and $e$ the disturbance deflections will then be reduced or will disappear.

By switching 21 in the cell $a$ to the right (in FIG. 4 in the drawing), when ground fault locating is not to be performed, 20 will be fed by the conventional main current. When closing 30 and 32—33 in the distributing box $e$ every instrument 8 and 8a connected to the measuring resistors 11, 11a, 10, 10a, 9, 9a and 7, 7a will show a constant and equivalent deflection. This test will show that the very important protecting circuit 14—6a—7a—61a—9a—6a—10a—62a—11a—6a is not open but has stable and low contact resistances in all connections from the switchgear cell $a$ to the utmost distributing box, perhaps in another building. The test current returns from 6a in the distributing box $e$ through 30, the fuse 31, the switch contacts 32—30, and lines 6, 11, 62, 6, 9, 61, 7, 6, 16 to 14. Since the total resistance of the circuit described above is known by the known data of the cables 79 and 101 and since the impressed test voltage in 14–16 is known and can be held constant, the millivoltmeters 8, 8a in the circuit mentioned may be calibrated in ohms and thus will show the actual resistance at any time by closing 30 and 32—33 in e. Another resistance control may be made by closing for a short time the push-button 28 (provided with a fuse 27) in the starter 25a for the motor 25. The push-button also may be used, when ground fault tracing is to be performed, in order to close a desirable disturbance compensating current flowing from 19, for example.

Compensating current furthermore may be delivered from a portable device 32, 33, 34, 35, applied for instance to the utmost distributing box e in a plant instead from the stationary device 19–24. The disturbance compensating voltages then will be fed from the amplifier 35 and/or the transformer 34 and will be impressed onto the measuring circuit 6—6a in the switch contacts 32, 33 whereby the switch is opened and the switch 30 is closed. The disturbance compensating current from 34 will flow through the following circuit: 33, 6, 11, 62, 10, 6, 9, 61, 7, 6, 16, 14, 6a, 7a, 61a, 9a, 6a, 10a, 62a, 11a, 6a, 30, 31, 32, 34, and each of the instruments 8, 8a connected to the measuring resistors 11, 11a, 10, 10a, 9, 9a, 7, 7a may be compensated for such deflections which emanate from the actual disturbing source, provided that 35 will be fed with voltages coming from the same disturbance source.

Since an open circuit in the leakage current wire system 6 or in the sheaths of the cables, system 6a, will spoil the locating of a ground fault and furthermore will become an electric danger, there are provided means for testing for open circuit in these circuits. The means are identical with those for compensating disturbance currents in the ground fault circuit, which currents are causing misleading deflections of the tracing instruments. When testing for open circuit as mentioned above the switch 21 may be thrown to the right. From any of the phases R S T, then a current will flow through a resistor shown in the drawing and through the contacts 23, 22 in switch 21 to one of the terminals of the amplifier 20 and from its other terminal to the neutral point of the main line. Transformer 19 then will induce an A.C. voltage, preferably less than 0.5 V, between the points 14 and 16. Since this voltage is constant and the current flowing through the instruments in the circuit 16, 6, 7, 61, 9, 6, 10, 62, 11, 6, 33, 32, 31, 30, 6a, 11a, 62a, 10a, 6a, 9a, 61a, 7a, 6a, 14, 16, is of the same value, these multivoltmeters may be provided with a scale in ohms, suitably—1 ohm.

The rectifying and reversing arrangements in FIG. 4 are described as follows:

In the switchgear room in the cell a, there will be arranged in the leakage indicating wire two rectifying tubes, 47, 48, and two D.C. relays 46, 45, the latter equipped with condensers 44 connected in a self-interrupting connection as shown in FIG. 1. When starting the pulser by closing 43, the relay 45 will open the contact 42 and also energize 46, which will close 41, thus causing the ground fault current, produced in 13, to flow through the closed switch 51, 52, through the tube 47, contact 41, and through 3, 2, to n, thereby being rectified to a direct current, flowing in the direction from 13 to n. When 41 opens and 42 closes in the next pulsing moment, the ground fault current will flow from n to 13 through 2, 3, 42, 48, 52, 51, 16, 6, 7, 61, 9, 6, 10, 11, 6, 12, 63, 13, thereby being rectified too, but in the reversed direction.

The reversing of the rectified ground fault current as described above has some advantages—such as avoiding such electrolytic polarization in the very ground fault contact place, which will occur when using single wave rectifying of the fault current.

Another advantage is the possibility, especially in the most distant distributing boxes, to replace the stationary millivoltmeters 8, 8a by more simple, stationary, arranged, magnetically polarized bars 88, 88a, shown in the distributing box f, the said bars being placed within the active zone (for instance at 6, 6a in f) of the magnetic field which is generated by the rectified ground fault current from the ground fault in 13. The frequency of the natural vibrations of these bars 88, 88a may answer to the pulsatory frequency imposed by 45, 46 of the single rectified and regularly reversed ground fault current.

Under special circumstances it is desirable to disconnect for a very short time in the switchgear room, when tracing a ground fault or when performing a special control, the leakage current wires 6, and to disconnect in the additional circuit the wires 6a of the outgoing cables 79, 80, what can be done by arranging a contact device 72a, 72, suitably in series with the measuring resistors 70a, 70 respectively. In order not to omit the closing of these important contacts after having terminated the actual control, they are provided with any of the known indicating devices, for instance the neon tubes 71, 71a, which indicate, when lighting, that the contact is open and that a voltage difference is prevailing over the contact amounting to at least the voltage for incandescing.

What I claim as new and wish to protect by Letters Patent is:

1. In a system for locating ground faults in energized electric networks for alternating current having main lines consisting of circuits having cables, said cables having internal cable covers, said networks comprising load objects having frames, distributing boxes, switchboard cells, devices for excess current protection for components in said network and a neutral point which is isolated to the ground; said neutral point being connected by way of a first wire for leakage indication to a first bus-bar for leakage current wires, a regulating device for current limitation interposed in said first wire, a current measuring instrument in said first wire and a switch for interrupting said connection between said regulating device and said first bus-bar, said leakage wires being disposed in parallel to said main lines of said networks, said regulating device being adapted to prevent said leakage current from releasing said devices for excess current protection in said components, said first bus-bar and said leakage current wires serving as test circuits, said first bus-bar and said leakage current wires comprising first measuring resistors in each of said leakage current wires, second measuring resistors connected in series to said first mentioned resistors and to second bus-bars in said distributing boxes and said switchboard cells, said first and said second measuring resistors having low resistance in relation to the impedance of said regulating device and of said leakage current wires, and indicator devices each comprising a voltmeter for indicating ground leakage current, said first and said second resistors being adapted to be connected to said indicator devices.

2. The combination as set forth in claim 1, having a potential transformer and a voltmeter connected to said first leakage indication wire, said switch being adapted alternatingly to switch on said transformer and said regulating device, said regulating device being capable of keeping said leakage current, passing through said device, substantially constant at varying impressed voltages.

3. The combination as set forth in claim 2, said first leakage indication wire having an automatic pulser connected thereto, said pulser operating for rhythmically varying said leakage current.

4. The combination as set forth in claim 3, said first leakage indication wire comprising a rectifier for rectifying alternating leakage current into continuous current.

5. The combination as set forth in claim 4, said first leakage indication wire comprising devices for modulating said alternating leakage current prior to being rectified, for super-imposing an alternating signal current over said rectified leakage current.

6. In plants, the combination as set forth in claim 1, said internal cable covers comprising electrically conducting material, said second leakage current wire being connected to said frames, said frames having no contact with said internal cable covers, measuring resistors and additional bus-bars in said distributing boxes and in said cells, said internal cable covers being connected to said measuring resistors and to said additional bus-bars and grounded in said switchboards, whereby a measuring circuit similar to said leakage current wires is constituted but separated from the latter for locating such ground leakage faults which enter only said cable covers and into said frames and into said distributing boxes.

7. The combination as set forth in claim 5, said indicator devices consisting in magnetically polarized bars located within the active zone of the magnetic field due to the rectified leakage current, said bars having natural vibrations responsive to the pulsatory frequency of said rectified leakage current, said bars performing perceptible movements.

8. The combination as set forth in claim 7, further comprising two rectifier tubes and two alternating relays in said first wire for leakage indication, said rectifier tubes and said relays rectifying said leakage current in double directions with alternatingly reversed poles.

9. The combination as set forth in claim 1, including measuring resistors having a contact device connected in series with said resistors whereby at least one of said circuits may be cut off, said contact device comprising an incandescing indicator device incandescing at low voltage for indicating the unclosed condition of said contact device and a prevailing voltage difference, said difference being equal to at least the initial voltage required for incandescing.

10. The combination as set forth in claim 1, wherein the regulating device is adapted automatically to keep the current passing through the device, almost nearly constant at varying impressed voltages.

References Cited in the file of this patent

UNITED STATES PATENTS

| | | |
|---|---|---|
| 1,105,883 | Creighton | Aug. 4, 1914 |
| 1,655,465 | Huber | Jan. 10, 1928 |
| 2,434,336 | Snook | Jan. 13, 1948 |
| 2,529,126 | Barnes | Nov. 7, 1950 |
| 2,594,994 | Rich | Apr. 29, 1952 |
| 2,721,307 | Bowles | Oct. 18, 1955 |